United States Patent [19]
Firgo et al.

[11] Patent Number: 5,919,412
[45] Date of Patent: Jul. 6, 1999

[54] CELLULOSE FIBRE

[75] Inventors: Heinrich Firgo, Vöcklabruck; Eduard Mülleder, Linz; Sigrid Seidl, Seewalchen, all of Austria

[73] Assignee: Lenzing Aktiengesellschaft, Lenzing, Austria

[21] Appl. No.: 08/849,630

[22] PCT Filed: Oct. 3, 1996

[86] PCT No.: PCT/AT96/00180

§ 371 Date: Aug. 22, 1997

§ 102(e) Date: Aug. 22, 1997

[87] PCT Pub. No.: WO97/13893

PCT Pub. Date: Apr. 17, 1997

[30] Foreign Application Priority Data

Oct. 6, 1995 [AT] Austria ................................ 1663/95

[51] Int. Cl.$^6$ ...................................................... D01F 2/00
[52] U.S. Cl. ............... 264/187; 264/211.13; 264/211.14; 106/200.2; 106/200.3; 106/202.1; 139/420 B; 66/202
[58] Field of Search ............................. 264/211.12, 187, 264/211.13, 211.14; 536/18.7; 106/200.2, 200.3, 202.1; 139/420 B; 66/202

[56] References Cited

U.S. PATENT DOCUMENTS

| | | | |
|---|---|---|---|
| 5,543,101 | 8/1996 | Rüf et al. | 264/187 |
| 5,589,125 | 12/1996 | Zikeli et al. | 264/187 |
| 5,662,858 | 9/1997 | Firgo et al. | 264/474 |
| 5,684,141 | 11/1997 | Schrell et al. | 536/187 |

FOREIGN PATENT DOCUMENTS

| | | |
|---|---|---|
| 0538977A1 | 3/1992 | European Pat. Off. . |
| A4312219 | 4/1993 | Germany . |
| 690296 | 6/1965 | Italy . |
| WO9207124 | 4/1992 | WIPO . |
| WO9214871 | 9/1992 | WIPO . |
| WO9420656 | 9/1994 | WIPO . |
| WO9500697 | 1/1995 | WIPO . |
| WO9515342 | 6/1995 | WIPO . |
| WO9530043 | 11/1995 | WIPO . |
| WO9626220 | 8/1996 | WIPO . |

OTHER PUBLICATIONS

English translation of the Abstract—p. 64, *Melliand Textilberichte*, No. 6, Jun. 1964.

English translation of the claims of German patent document DE A 4 312 219.

English translation of claims 1, 11 and 12 PCT Publication WO 96/26220.

"A Delayed–Curing Cotton Fabric Based on an Internally Catalyzed Cotton Cellulose and Divinyl Sulfone", by Rowland and Brannan—*Textile Research Journal*, Feb. 1969, pp. 173–180.

"New Methods for Improving the Dyeability of Cellulose Fibres with Reactive Dyes", by Lewis and Lei—*Journal of the Society of Dyers and Colorists*, vol. 107, Mar. 1991.

"New Possibilities to Improve Cellulosic Fibre Dyeing Processes with Fibre–Reactive Systems", by Lewis —*Journal of the Society of Dyers and Colorists*, vol. 109, Nov. 1993.

*Chemical Aftertreatment of Textiles*, edited by Mark, Wooding and Atlas, John Wiley and Sons, © 1971, p. 414.

*Melliand Textilberichte*, No. 6, Jun. 1964, pp. 641–647.

"Precipitation and Crystallization of Cellulose From Amine Oxide Solutions", by Dub˝ and Blackwell—*TAPPI Proceedings*, International Dissolving and Specialty Pulps, 1983, pp. 1–119.

*Primary Examiner*—Christopher Raimund
*Attorney, Agent, or Firm*—Baker & Botts LLP

[57] ABSTRACT

The invention is an amine-oxide process for the production of a cellulose moulded body, wherein a suspension of cellulose in an aqueous tertiary amine-oxide is converted into a cellulose solution which is moulded and passed through an aqueous precipitation bath. A moulded body is obtained which, optionally after washing, is treated with a crosslinking agent. The cellulose solution contains a substance whereby the crosslinking agent may be activated. The process according to the invention allows the production of fibres having effectively controllable fibrillation properties.

25 Claims, No Drawings

CELLULOSE FIBRE

BACKGROUND OF THE INVENTION

The present invention is concerned with a new cellulose moulded body and a process for the production of this cellulose moulded body. Particularly, the present invention is concerned with a new cellulose fibre and a new cellulose film having a predetermined tendency to fibrillation.

For the purposes of the present specification and claims, the term "moulded body" means particularly fibres and films. In the following, the term "fibres" means fibres, films and also other moulded bodies.

As an alternative to the viscose process, in recent years there has been described a number of processes wherein cellulose, without forming a derivative, is dissolved in an organic solvent, a combination of an organic solvent and an inorganic salt, or in aqueous saline solutions. Cellulose fibres made from such solutions have received by BISFA (The International Bureau for the Standardisation of man made Fibres) the generic name Lyocell. As Lyocell, BISFA defines a cellulose fibre obtained by a spinning process from an organic solvent. By "organic solvent", BISFA understands a mixture of an organic chemical and water.

The present invention is concerned with a specific process for the production of a cellulose fibre of the Lyocell type, wherein a cellulose solution is extruded across an air gap into an aqueous precipitation bath. In the following, this process will be referred to as amine-oxide process, wherein a tertiary amine-oxide, particularly N-methylmorpholine-N-oxide (NMMO), is used as a solvent. Such a process is described for instance in U.S. Pat. No. 4,246,221 and provides fibres which exhibit a high tensile strength, a high wet-modulus and a high loop strength.

A typical feature of the Lyocell fibres is their pronounced tendency to fibrillate when wet. Fibrillation means the breaking off of the fibre in longitudinal direction at mechanical stress in a wet condition, so that the fibre gets hairy, furry. The reason for fibrillation may be that the fibres consist of fibrils which are arranged in the longitudinal direction of the fibre axis and that there is only little crosslinking between these.

WO 92/14871 describes a process for the production of a fibre having a reduced tendency to fibrillation. The reduced tendency to fibrillation is achieved by providing all the baths with which the fibre is contacted before the first drying with a maximum pH value of 8,5.

WO 92/07124 also describes a process for the production of a fibre having a reduced tendency to fibrillation wherein the freshly spun, i.e. never dried fibre is treated with a polymer that can be made cationic. As such a polymer, a polymer having imidazole and azetidine groups is mentioned. Additionally, there may be carried out a treatment with an emulsifiable polymer, such as polyethylene or polyvinylacetate, or a crosslinking with glyoxal.

In a lecture given by S. Mortimer at the CELLUCON conference in 1993 in Lund, Sweden, it was mentioned that the tendency to fibrillation rises as drawing is increased.

There have been published already some methods to reduce the tendency to fibrillation of Lyocell fibres:

Thus from WO 95/02082 of the applicant it is known that fibrillation may be reduced by certain combinations of spinning parameters.

Moreover, it is known that the fibrillation properties of Lyocell fibres may be improved by chemical crosslinking. Thus, e.g. EP-A-0 538 977 describes crosslinking of Lyocell fibres with chemical reagents able to react with cellulose in the never dried state, i.e. when the fibre is produced, as well as in the dried state, i.e. substantially during the textile finishing of the plane fibre assemblies.

It is known further that the tendency to fibrillation of Lyocell fibres may be reduced by crosslinking them with glyoxal (M. Dubé and R. H. Blackwell, TAPPI Proceedings; International Dissolving and Specialty Pulps, pages 111–119; 1983).

Crosslinking Lyocell fibres during their textile finishing has the main drawback for the finishing operator of requiring additional steps which cause additional costs. Also, the application of such additional steps limits the variety of produceable plane fibre assemblies, which again restricts the marketing possibilities of the Lyocell fibres. A further essential disadvantage of the treatment of Lyocell fibres after a first drying consists in that the susceptibility of the fibres for crosslinking chemicals is significantly reduced, particularly after the first drying, as compared to the state they exhibit when they are freshly spun. This requires the use of greater amounts of chemicals.

The crosslinking reagents exemplified in the patent application mentioned above exhibit as groups capable of crosslinking halogen-substituted, nitrogen-containing ring structures able to react with the hydroxyl groups of the cellulose in alkaline conditions. Moreover, compounds comprising vinyl sulphone groups or their precursors are described. These compounds substantially also react only when alkali is added, or they require alkali as a neutralisation reagent for cleaved acids. The procedures proposed in this patent application for crosslinking never dried Lyocell fibres have serious drawbacks insofar as it is difficult and requires a complex arrangement to carry them out in a continuous fibre post-treatment process. When very reactive compounds of the compound classes indicated are used, a separate application of the crosslinking substances from the basic compounds necessary to initiate the reaction with the cellulose is required. When less reactive compounds are used, frequently a simultaneous application of the crosslinking agents and the alkali is possible, but in this case a temperature step has to be carried out which in the indicated patent application is achieved by "steaming". Thus, a serious drawback of the indicated patent is an increase of the number of post-treatment steps, which implies a significant cost raise, especially when constructing a plant for the production of such a fibre.

However, there is still a further drawback to this procedure. When halogenated, nitrogen-containing rings or the vinyl sulphons and their precursor substances respectively are reacted, salts are formed during the crosslinking reaction which have to be washed out of the fibre afterwards. Moreover, also excess residual chemicals not reacted with the cellulose have to be washed out. This means that in a continuous fibre production process, a further post-treatment step is necessary, causing further investment and operating costs and creating additional problems with contaminated waste water.

In WO 94/24343 of the applicant, similar processes for crosslinking Lyocell fibres to reduce fibrillation describing the use of alkaline buffers and an exposure to electromagnetical waves as particularly advantageous are proposed.

WO 94/20656 describes a reduction of the fibrillation of Lyocell fibres by means of crosslinking using conventional crosslinking chemicals usually employed to improve crease angles of cellulose textiles while a simultaneous reduction of the dye absorption is prevented when the crosslinking is carried out in the simultaneous presence of flexible, linear polymers. Substantially, conventional N-methylol resins (containing a low formaldehyde level) and the usual acidic catalysts are used. This method is described as efficient for use on the dried as well as the never dried fibre.

However, also this procedure has drawbacks which make another crosslinking method desirable. The methylol resins usually employed for improving the wet crease angles need relatively high reaction temperatures, generally from 120° C. to 160° C., to react with the OH groups of the cellulose, when the reaction is to be carried out at a sufficient rate. In the international patent application indicated, also very high temperatures for fixing the crosslinking agents are applied. This always implies a more or less significant loss of fibre strength, but above all a loss of fibre elongation and loop strength, and the fibre is getting brittle. Moreover, in the cited patent application no comparative physical fibre data before and after the crosslinking reaction are indicated. Reactions with the cited N-methylol compounds at low temperatures und thus a higher fibre moisture, which do not imply such serious strength and elongation losses, usually require very long reaction times and therefore are hardly suitable for continuos fibre production processes.

In "Textile Research Journal", February 1969, pages 173–180, S. P. Rowland and M. A. F. Brannan describe that quaternized 2-(diethylamino)ethylcellulose produced from cotton fabric is capable of being crosslinked in the form of the hydroxy base with disulphone or bis-(2-hydroxyethyl) sulphone at room temperature in wet state or dry at a temperature of 140° C., and that very good wet crease angles will result from wet crosslinking.

Moreover it is known that cellulose fibre textiles may be dyed with conventional reactive dyes at neutral pH values and without adding salt when they are appropriately pre-treated (Lewis et al., JSDC volume 107, March 1991, and JSDC volume 109, November 1993). The nitrogen hetero rings containing vinyl sulphone or halogens which under alkaline conditions usually react as anchoring groups with the hydroxy groups of the cellulose will react with the amino groups without addition of alkali, since they represent significantly stronger nucleophiles than the hydroxy groups.

In "Chemical Aftertreatment of Textiles" (H. Mark, N. S. Wooding, S. M. Atlas), page 414, a wet crosslinking of quaternized diethylaminocellulose in hydroxy form at room temperature is described.

From WO 95/15342 it is known to react cellulose with a carboxy methylating agent. EP-A-0 665 311 describes the production of aminated cellulose fibres by adding e.g. an amine-substituted cellulose derivative to a cellulose solution and spinning fibres from the solution.

In the Italian patent application 690,926 (1965), the inner salt of trissulfatoethylsulphonium is described for the alkaline crosslinking of gelatine. The reaction is carried out at pH 7 and at a temperature of 50° C.

SUMMARY OF THE INVENTION

It is the object of the invention to produce a Lyocell moulded body having reduced and effectively controllable fibrillation properties by means of crosslinking reactions, while the production process does not present the disadvantages of the known crosslinking processes described. It is a further object of the invention to provide fibres having improved wet crease angles in a plane fibre assembly, thus allowing the production of Lyocell textiles without any of the high-grade finishing chemicals usually employed in textile finishing.

According to the invention, this objective is attained by means of a process according to the amine-oxide process for the production of a cellulose moulded body, wherein a suspension of cellulose in an aqueous tertiary amine-oxide is converted into a cellulose solution which is moulded and passed through an aqueous precipitation bath, thus a moulded body being obtained which, optionally after washing, is treated with a crosslinking agent, characterized in that a cellulose solution containing a substance whereby the crosslinking agent may be activated is employed for moulding.

DETAILED DESCRIPTION OF THE PREFERRED EMBODIMENTS

It has been shown that crosslinking a cellulose moulded body may be effectively controlled by means of the amount of substance necessary for activating the crosslinking agent, and that this control may be carried out in an efficient way when the activating substance is not contained in a post-treatment bath, as proposed in the state of the art, but in the moulded cellulose solution, i.e. within the moulded body itself. It has been further shown that even when water-soluble substances are used, they will not be dissolved, neither by the precipitation bath nor by an optional washing, in such amounts as to impede an economic operation of the process according to the invention.

The degree of crosslinking determines the tendency to fibrillation such that a high crosslinking degree will give a fibre having a reduced tendency to fibrillation and, inversely, a reduced crosslinking degree will give a fibre having a higher tendency to fibrillation.

Conveniently, the activating substance, for instance a base or an acid, is added to the cellulose suspension as an inactive pre-stage, for instance as a neutral salt such as a chloride, sulfate or an alkali or earth alkali salt, being evenly spread within the moulded body. When an inactive pre-stage is used, the fibre is afterwards subjected to a treatment with a base or an acid, whereby the activating substance is transformed into the base or acid form respectively. Thereafter, the fibre is contacted, after an optional washing, with the crosslinking agent. In a particularly preferred embodiment, the fibre has a moisture content of from 70% to 150% during the crosslinking reaction. The crosslinking agents are known chemicals employed in textile finishing of cellulose textiles. Substantially they are molecules carrying the known reactive groups of the reactive dyes, which may be coloured or not coloured.

Naturally, those skilled in the art may employ also others than the crosslinking chemicals here indicated, namely commercially available or new ones specifically synthesized for the crosslinking of Lyocell fibres. The compounds may contain at least two equal or different reactive groups, but they also may comprise several such groups.

From EP-A-0 538 977 it is known to treat fibres in a not dried state in a first step with an aqueous solution of a mild alkali and afterwards, in a second step, treat the alkalized fibre with an aqueous solution of the crosslinking agent wherein no alkali is to be contained. As a mild alkali, sodium carbonate, sodium bicarbonate and sodium hydroxide are indicated. When this procedure is employed, the tendency to fibrillation is said to be still more reduced than when both solutions contain alkali.

The drawback of this procedure described in EP-A-0 538 977 consists in that it is not possible to incorporate a certain amount of alkali efficiently into the fibre, and that therefore the reduction of the tendency to fibrillation cannot be controlled.

A further advantage of the process according to the invention is that very reactive crosslinking agents may be used, since it is not necessary to apply the crosslinking agents to the fibre in a joint solution together with the activating substance such as a base. Thus a hydrolytic destruction of the crosslinking agent is prevented. Moreover, it is advantageous that due to the high concentration of the activating substance such as a base, only stoichiometric amounts will be required, resulting in a nearly unlimited stability in the crosslinking bath. In this way, the degree of fibrillation reduction may be controlled and freely chosen by means of the amount of base incorporated.

Thus, according to a preferred embodiment of the process according to the invention, a crosslinking agent capable of being activated by a base is employed. In this case, the substance contained in the cellulose solution comprises preferably at least one quaternary ammonium group in the form of a neutral salt. Conveniently, such a substance is a polymer, particularly a cellulose derivative or another polysaccharide derivative, a starch derivative or a synthetic polymer or a monomer reacting with the cellulose.

An advantageous embodiment of the process according to the invention is characterized in that this substance is provided by adding it to the cellulose suspension and by contacting the moulded body with a hydroxide base to convert the at least one quaternary ammonium group into the hydroxide form.

The substance for activating the crosslinking agent may be contained in the moulded body in an understoichiometric ratio to the crosslinking agent.

A crosslinking agent comprising at least two groups selected from vinyl sulphone groups, halogen-containing nitrogen hetero rings, epoxy groups and activated double bonds able to react with the hydroxy groups of the cellulose is preferably employed.

According to the invention, a crosslinking agent which may be activated by an acid may also be used. In this case, a substance comprising at least one carboxyl group, sulphonic acid group or phosphonic acid group in the form of a neutral salt is preferably employed to activate this crosslinking agent.

Conveniently, such a substance is a polymer, particularly a cellulose derivative or another polysaccharide derivative, a starch derivative or a synthetic polymer or a monomere reacting with the cellulose. Copolymers produced from hydrophilic and hydrophobic monomers are also appropriate. By means of a precise adjustment of the ratio at the two monomers, a maximum substitution with functional groups as well as a reduced solubility in the precipitation bath may be achieved.

Such a substance may be provided in the moulded body by adding it to the cellulose suspension and by contacting the moulded body with a proton acid or an aqueous solution of a Lewis acid to transform the neutral salt into the acid form and into the acidic Lewis salt form respectively.

The substance for activating the crosslinking agent may be contained in the moulded body in an understoichiometric ratio to the crosslinking agent.

As crosslinking agents, aldehydes such as formaldehyde, glyoxal, acetals, aminals, compounds having at least 2 carboxyle groups, N-methylol compounds of urea or derivatives of dihydroxyethylene urea have shown especially good results. However, other crosslinking agents capable of being activated by an acid may also be employed.

A further object of the invention is a cellulose moulded body obtainable according to the process according to the invention and is preferably provided as a fibre or a film.

A further object of the invention is a woven, a non-woven and a knit fabric characterized in that it contains a fibre according to the invention. It has been shown that such a fabric has improved wet crease angels. Thus the fibre according to the invention allows the production of textiles without employing any of the usual high-grade finishing chemicals used for textile finishing.

As mentioned above, according to the invention the fibre is preferably crosslinked in a moist state. Thus the fibres produced according to the amine-oxide process obtain their known good physical fibre data such as a high wet strength, a high loop strength and a high wet-modulus. Moisture contents of from 40% up to a free swelling, which occurs when the fibre floats in a long bath, are preferred.

By means of the following Examples, the invention will be described in still more detail.

EXAMPLE 1

To a suspension of pulp in an aqueous solution of NMMO having a water content of 40% by mass, polydiallyldimethylammoniumchloride is added as a crosslinking catalyst in such an amount that in the subsequent crosslinking reaction an average substitution degree of 0.02 will result. The content of pulp in the suspension is selected such that after evaporation of the excess water a final concentration of cellulose of 10% by mass is obtained.

The suspension is converted into a mouldable cellulose solution using the thin-film technique according to the process described in EP-A-0 356 419, and spun to fibres and passed through an aqueous precipitation bath wherein the cellulose is precipitated according to the process described in WO 93/19230.

Thus polydiallyldimethylammoniumchloride is contained in the fibres. Subsequently, the NMMO is washed out of the fibres by means of water. Also during this washing, the dissolution of the crosslinking catalyst from the fibre is not substantial.

By treating the fibres with aqueous sodium hydroxide (4 g of NaOH/l), the crosslinking catalyst is transformed from the chloride form into the active hydroxide form and subsequently treated with an aqueous solution of the inner salt of disodium-tris($\beta$-sulphatoethyl)sulphonium. After squeezing the fibres to 130% of moisture, they are dried. The fibres obtained have a significantly reduced tendency to fibrillation.

EXAMPLE 2

Fibres are produced analogously to Example 1, adding however 1% cellulose derivatized with glycidyltrimethylammoniumchloride and having an average substitution degree of 0.3 instead of the polydiallyldimethylammoniumchloride. Transformation into the hydroxide form is carried out by means of aqueous KOH (3 g of KOH/l).

Afterwards the fibres are treated with a polyethylenglycol (MW 300) comprising two epoxy groups on its ends (25 g/l), squeezed to 120% of moisture and heated in a microwave oven for 3 minutes. Fibres having a significantly reduced tendency to fibrillation are obtained.

EXAMPLE 3

Fibres are produced analogously to Example 1, adding however 2% sodium salt of the polyvinylsulphonic acid instead of the polydiallyldimethylammoniumchloride. By means of a subsequent washing with an aqueous solution of magnesium sulphate (4 g/l), the fibre is transformed into the magnesium salt form, squeezed and treated with a solution (40 g/l) of a commercially available N-methylol compound of urea such as dimethylol urea (KAURIT S made by BASF), dimethylolhydroxyethylene urea (FIXAPRET CP made by BASF).

After squeezing the fibres to 130% of moisture they are heated for 3 minutes in a microwave oven. In each case, fibres having a significantly reduced tendency to fibrillation are obtained.

EXAMPLE 4

Fibres are produced analogously to Example 1, adding however 0.6% sodium salt of the poly-p-styrenesulphonic acid instead of the polydiallyldimethylammoniumchloride. By means of a subsequent washing the NMMO is washed out of the fibres and the fibres are transformed into the acid form by means of an aqueous sulphuric acid (4 g/l). Excess sulphuric acid is removed by a subsequent washing with water. Afterwards the fibres are treated with a solution of 50 g/l of formaldehyde and squeezed to 120% of moisture.

The fibres thus obtained are dried for 10 minutes at 100° C. Fibres having a significantly reduced tendency to fibrillation are obtained.

We claim:

1. A process according to the amine-oxide process for the production of a cellulose moulded body comprising the steps of:

providing a suspension of cellulose in an aqueous tertiary amine-oxide, and converting the suspension into a cellulose solution which is moulded and passed through an aqueous precipitation bath, thereby forming a moulded body which after washing, is treated with a crosslinking agent, wherein the cellulose solution includes a substance capable of activating the crosslinking agent.

2. A process according to claim 1 wherein said substance included in said cellulose solution comprises at least one quaternary ammonium group in the form of a neutral salt and wherein the crosslinking agent is capable of being activated by a base.

3. A process according to claim 2 wherein the substance comprises a polymer.

4. A process according to claim 3 wherein the polymer is selected from the group consisting of a cellulose derivative, polysaccharide derivative, a starch derivative and a synthetic polymer.

5. A process according to claim 2 wherein said substance comprises a monomer capable of reacting with cellulose.

6. A process according to any one of claims 2, 3, 5 or 4 comprising adding said substance to the cellulose suspension and contacting said moulded body with a hydroxide base to transform the at least one quaternary ammonium group into the hydroxide form.

7. A process according to claim 6 wherein said substance is present in said moulded body in an understoichiometric ratio to said crosslinking agent.

8. A process according to claim 6 wherein the crosslinking agent comprises at least two groups selected from the group consisting of vinylsulphone groups, halogen-containing nitrogen hetero rings, epoxy groups and activated double bonds capable of reacting with hydroxy groups in cellulose.

9. A cellulose moulded body according to a process according to claim 6.

10. A cellulose moulded body according to claim 6 wherein the body is one selected from the group consisting of a fibre and a film.

11. A fabric selected from the group consisting of woven fabric, non-woven fabric and knit fabric wherein the fabric includes a fibre according to claim 10.

12. A process according to any one of claims 2, 3, 5 or 4 wherein said substance is present in said moulded body in an understoichiometric ratio to said crosslinking agent.

13. A process according to any one of claims 2, 3, 5 or 4 wherein the crosslinking agent comprises at least two groups selected the group consisting of vinylsulphone groups, halogen-containing nitrogen hetero rings, epoxy groups and activated double bonds capable of reacting with hydroxy groups in cellulose.

14. A process according to claim 1 wherein the crosslinking agent is capable of being activated by an acid and wherein the substance includes at least one of a neutral salt selected from the group consisting of a carboxyl group, sulphonic acid group and phosphonic acid group.

15. A process according to claim 14 wherein the substance comprises a polymer.

16. A process according to claim 14 wherein said substance comprises a monomer capable of reacting with cellulose.

17. A process according to claim 15 wherein the polymer is selected from the group consisting of a cellulose derivative, a polysaccharide derivative, a starch derivative and a synthetic polymer.

18. A process according to any one of claims 14, 15, 16 or 17 comprising adding said substance to the cellulose suspension and contacting said moulded body with one selected from the group consisting of a proton acid and an aqueous solution of a Lewis acid to transform said neutral salt.

19. A process according to claim 18 wherein said substance is present in said moulded body in an understoichiometric ratio to said crosslinking agent.

20. A process according to claim 19 wherein the crosslinking agent comprises at least one selected from the group consisting of formaldehyde, glyoxal, compounds having at least 2 carboxyl groups, N-methylol compounds of urea and derivatives of dihydroxyethylene urea.

21. A process according to any one of claims 14, 15, 16, or 17 wherein said substance is present in said moulded body in an understoichiometric ratio to said crosslinking agent.

22. A process according to claim 21 wherein the crosslinking agent comprises at least one selected from the group consisting of formaldehyde, glyoxal, compounds having at least 2 carboxyl groups, N-methylol compounds of urea and derivatives of dihydroxyethylene urea.

23. A cellulose moulded body obtainable according to a process according to any one of claims 1, 2, 3, 5, 14, 15, 16, 4 or 17.

24. A cellulose moulded body according to claim 23 wherein the body is one selected from the group consisting of a fibre and a film.

25. A fabric selected from the group consisting of woven fabric, non-woven fabric and knit fabric wherein the fabric includes a fibre according to claim 24.

* * * * *